(12) United States Patent
Lee et al.

(10) Patent No.: US 7,797,350 B2
(45) Date of Patent: Sep. 14, 2010

(54) SYSTEM AND METHOD FOR PROCESSING DOWNLOADED DATA

(75) Inventors: Chung-I Lee, Taipei Hsien (TW); Chien-Fa Yeh, Taipei Hsien (TW); Da-Peng Li, Shenzhen (CN); Zhi-Hong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 341 days.

(21) Appl. No.: 11/967,091

(22) Filed: Dec. 29, 2007

(65) Prior Publication Data
US 2009/0043815 A1 Feb. 12, 2009

(30) Foreign Application Priority Data
Aug. 10, 2007 (CN) .................. 200710201340.0

(51) Int. Cl.
*G06F 17/30* (2006.01)
(52) U.S. Cl. ........................... 707/802; 707/803
(58) Field of Classification Search ............. 707/802, 707/803
See application file for complete search history.

(56) References Cited

U.S. PATENT DOCUMENTS

| | | | |
|---|---|---|---|
| 6,131,098 A * | 10/2000 | Zellweger | 707/802 |
| 6,336,117 B1 * | 1/2002 | Massarani | 707/711 |
| 6,484,156 B1 * | 11/2002 | Gupta et al. | 707/802 |
| 6,513,043 B1 * | 1/2003 | Chan et al. | 707/802 |
| 6,587,856 B1 * | 7/2003 | Srinivasan et al. | 707/802 |
| 6,654,741 B1 | 11/2003 | Cohen et al. | |
| 6,970,876 B2 * | 11/2005 | Hotti et al. | 707/634 |
| 7,010,536 B1 * | 3/2006 | De Angelo | 707/796 |
| 7,035,862 B2 * | 4/2006 | Patitucci | 707/752 |
| 7,146,367 B2 * | 12/2006 | Shutt | 709/217 |
| 7,149,754 B2 * | 12/2006 | Miller et al. | 707/803 |
| 7,181,456 B2 * | 2/2007 | Huang | 707/803 |
| 7,236,990 B2 * | 6/2007 | McCauley et al. | 707/694 |
| 2002/0010725 A1 * | 1/2002 | Mo | 707/530 |
| 2002/0078093 A1 * | 6/2002 | Samaniego et al. | 707/513 |

* cited by examiner

*Primary Examiner*—Don Wong
*Assistant Examiner*—Kim T Nguyen
(74) *Attorney, Agent, or Firm*—Frank R. Niranjan

(57) ABSTRACT

A system for processing downloaded data is provided. The system includes a local server, a database server, an image storage server and a plurality of client computers. The database server, the image storage server and the client computers are connected to the local server. The local server is configured for downloading data from a remote server, parsing the downloaded data and replacing URL information of each image in the downloaded data to a predetermined character string, and changing the character strings to default local URLs that can display the images, when the client computers request to access the downloaded data. A related method is also provided.

6 Claims, 4 Drawing Sheets

SYSTEM AND METHOD FOR PROCESSING DOWNLOADED DATA

BACKGROUND OF THE INVENTION

1. Field of the Invention

The present invention relates to data processing systems and methods, particularly to a system and method for processing downloaded data.

2. Description of Related Art

With the development of computer technology and network technology, the Internet has become a main medium for people to acquire information. People can search on their favorite subjects, gather all kinds of data of the subject, and can even create a business over the Internet.

Uniform Resource Identifiers/Locators (URIs, URLs) are short character strings that specify resources of objects on the Internet: documents, images, downloadable files, services, electronic mailboxes, and other resources. They make resources available under a variety of naming schemes, and access methods such as Hypertext Transfer Protocol (HTTP), File Transfer Protocol (FTP).

During the development of new products, engineers need to analyze massive data, which mostly shown by Web pages, about products related to the new products from the Internet. The data often includes a great number of images. When the data is downloaded, original URLs of the images in the data are often modified to local URLs on a local server by an administrator. Users on client computers connected to the local server can access the images via the local URLs. However, if the local URLs change and the users are not notified of new local URLs, the users would fail to access the images.

What is needed, therefore, is a system and method for processing downloaded data, which can process URL information in downloaded data flexibly.

SUMMARY OF THE INVENTION

A system for processing downloaded data according to a preferred embodiment is provided. The system includes a local server, a database and an image storage. The database and the image storage are connected to the local server. The local server includes: a data cache for storing downloaded data temporarily; a data parsing module configured for parsing the downloaded data to retrieve text content and original Resource Locator (URL) information of each image in the downloaded data; an image attribute changing module configured for replacing the original URL information of each image by a predetermined character string which includes an identifier of the image; and a data storing module configured for storing the text content and character strings of all images in the downloaded data to the database. The database is configured for creating a record for each image to record information of the image and returning image information to the data parsing module. The data parsing module is further configured for retrieving an image from the data cache based on the returned image information. The data storing module is further configured for storing all retrieved images to the image storage server, and storing data paths of the retrieved images returned by the image storage to respective records of images.

Another embodiment provides a preferred method for processing downloaded data. The method includes steps of: (A) storing downloaded data to a data cache of a local server temporarily; (B) parsing the downloaded data to retrieve text content and original URL information of each image in the downloaded data; (C) replacing the original URL information of each image by a predetermined character string which includes an identifier of the image; (D) storing the text content and character strings of all images in the downloaded data to a database server; (E) creating a record for each image to record information of the image; (F) returning the image information in each record to the local server; (G) retrieving an image from the data cache based on the returned image information in each record; (H) storing all retrieved images to an image storage server; and (I) storing data paths of the retrieved images returned by the image storage server to respective records of the images.

Other objects, advantages and novel features of the present invention will be drawn from the following detailed description of the preferred embodiment and preferred method of the present invention with the attached drawings.

DETAILED DESCRIPTION OF THE PREFERRED EMBODIMENT

Figure 1:
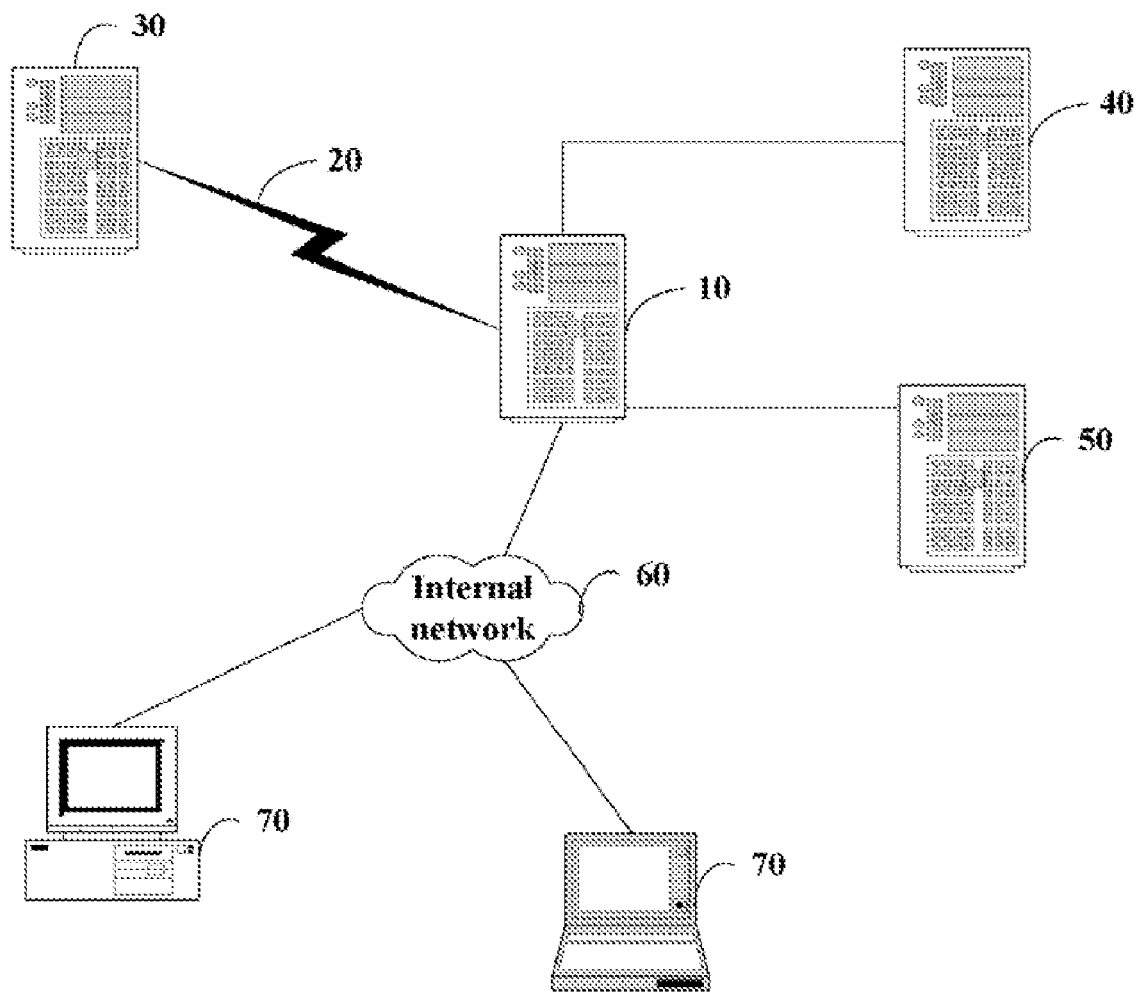
FIG. 1 is a schematic diagram of a system for processing downloaded data according to a preferred embodiment.

FIG. 1 is a schematic diagram of a system for processing downloaded data according to a preferred embodiment. The system includes a local server 10, which may be connected to a plurality of client computers 70 via a network, such as an internal network 60. The local server 10 is configured for downloading data from a remote server 30 via the Internet 20, parsing downloaded data, and storing text content and image files of the downloaded data to a database server 40 and an image storage server 50 respectively. In other embodiments, the database server 40 and the image storage server 50 can be internal storage devices or an external storage device of the local server 10. The local server 10 is further configured for receiving access request to the downloaded data from any of the client computers 70, retrieving the text content and the image files of the downloaded data from the database server 40 and the image storage server 50 respectively, and returning integrated downloaded data to the client computers 70.

Each client computer 70 has an interactive interface for users to send the access request to the downloaded data to the local server 10 and browsing the downloaded data.

Figure 2:
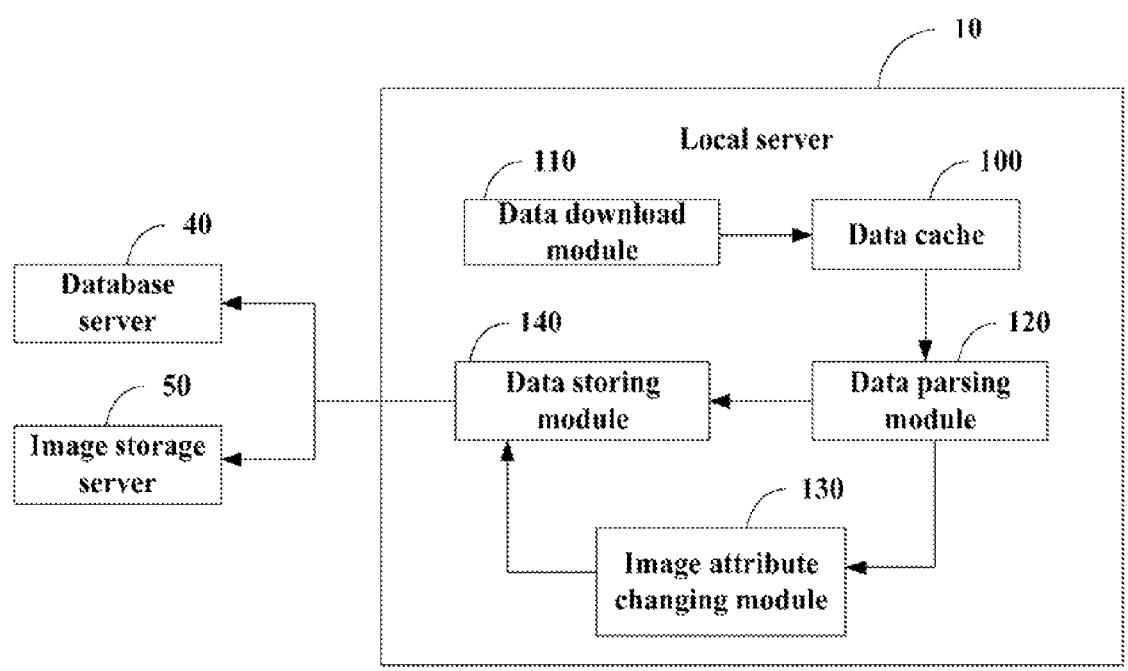
FIG. 2 is a schematic diagram of function modules of a local server in FIG. 1.

FIG. 2 is a schematic diagram of function modules of the local server 10. The local server 10 typically includes a data download module 110, a data parsing module 120, an image attribute changing module 130, and a data storing module 140.

The data download module 110 is configured for downloading data from the remote server 30 via the Internet 20, and storing the downloaded data into a data cache 100 of the local server 10. In this embodiment, the downloaded data are from news Web pages.

The data parsing module 120 is configured for parsing the downloaded data to retrieve text content and original URL information of each image file in the downloaded data, such as parsing a news Web page to retrieve Web site information of the news Web page, a publisher, a publish time, a title, a summary of the news, and URL information of each image in the news Web page, such as <image src=http://www.google.com/intl/zh-CN_ALL/images/logo.gif/>.

The image attribute changing module 130 is configured for replacing the original URL information of each image file in the downloaded data with a predetermined character string that includes an identifier of the image file, such as replacing <image src=http://www.google.com/intl/zh-CN_ALL/images/logo.gif/> with <image src="$1", wherein "$1" represents the image is the first image in the news Web page.

The data storage module 140 is configured for storing the text content, the original URL information and the character strings of all image files from the downloaded data (such as the news Web page) to the database server 40.

The database server 40 allocates an identification number to the downloaded data and an identification number to each image file in the downloaded data, such as an identification number of the news Web page and an identification number of each image file in the news Web page. The database server 40 further creates a record for each image file to record information of the image file. The record may include columns for recording information such as: the identification number of the news Web page that the image belongs to, the identification number of the image file, the original URL information of the image file, the character string that replaces the original URL information, a data path of the image file, and so on.

Furthermore, the database server 40 returns the recorded information of each image file to the local server 10. The data parsing module 120 retrieves an image file stored in the data cache 100 based on the returned image information in each record, and stores the image file to the image storage server 50.

The image storage server 50 returns a data path of each image file to the database server 40. The database server 40 stores the data path of each image file to a corresponding record of the image.

Figure 3:
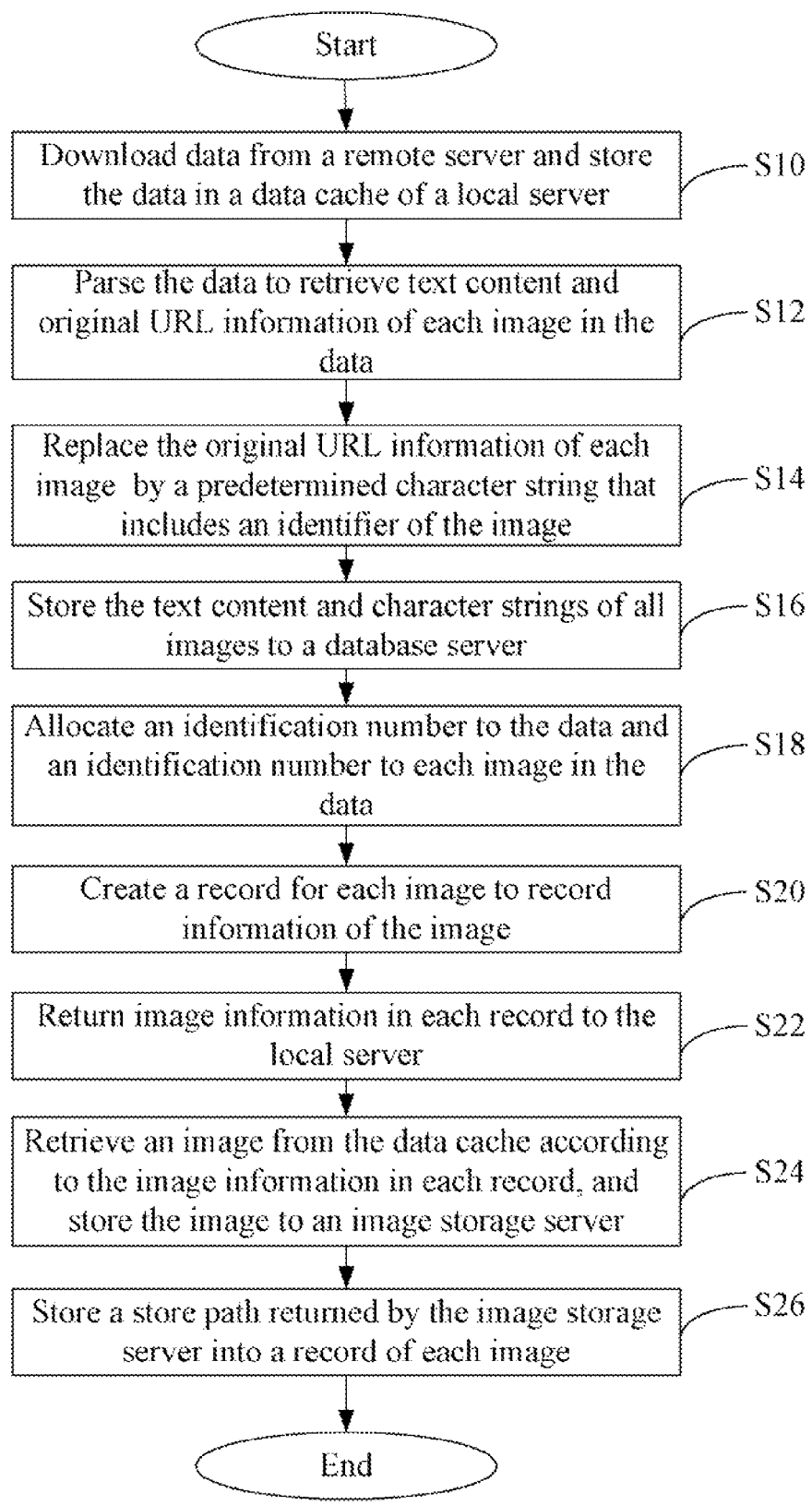
FIG. 3 is a flowchart of a method for processing downloaded data in accordance with a preferred embodiment.

FIG. 3 is a flowchart of a method for processing downloaded data in accordance with a preferred embodiment. In step S10, the data download module 110 downloads data from the remote server 30 via the Internet 20, and stores the downloaded data into a data cache 100 of the local server 10 temporarily. In this embodiment, the downloaded data are news Web pages.

In step S12, the data parsing module 120 parses the data to retrieve text content and original URL information in the downloaded data, such as parsing a news Web page, to retrieve Web site information of the news Web page, a publisher, a publish time, a title, a summary of the news, and URL information of each image file in the news Web page, such as <image src=http://www.google.com/intl/zh-CN_ALL/images/logo.gif/>.

In step S14, the image attribute changing module 130 replaces the original URL information of each image file in the downloaded data with a predetermined character string that includes an identifier of the image file, such as replacing <image src=http://www.google.com/intl/zh-CN_ALL/images/logo.gif/> by <image src="$1", wherein "$1" represents the image is the first image in the news Web page.

In step S16, the data storage module 140 stores the text content, the original URL information and the character strings of all image files in the downloaded data (such as the news Web page) to the database server 40.

In step S18, the database server 40 allocates an identification number to the downloaded data and an identification number to each image file in the downloaded data, such as an identification number of the news Web page and an identification number of each image file in the news Web page.

In step S20, the database server 40 creates a record for each image file to record information of the image file. The record may include columns for recording information such as: the ID of the news Web page which the image belongs to, the ID of the image file, the original URL information of the image file, the character string that replaces the original URL information, a data path of the image file, and so on.

In step S22, the database server 40 returns the recorded information of each image file to the local server 10.

In step S24, the data parsing module 120 retrieves an image stored in the data cache 100 based on the returned image information in each record, and stores the image to the image storage server 50.

In step S26, the image storage server 50 returns a data path of each image to the database server 40, and the database server 40 stores the data path of each image to a corresponding record of the image.

Figure 4:
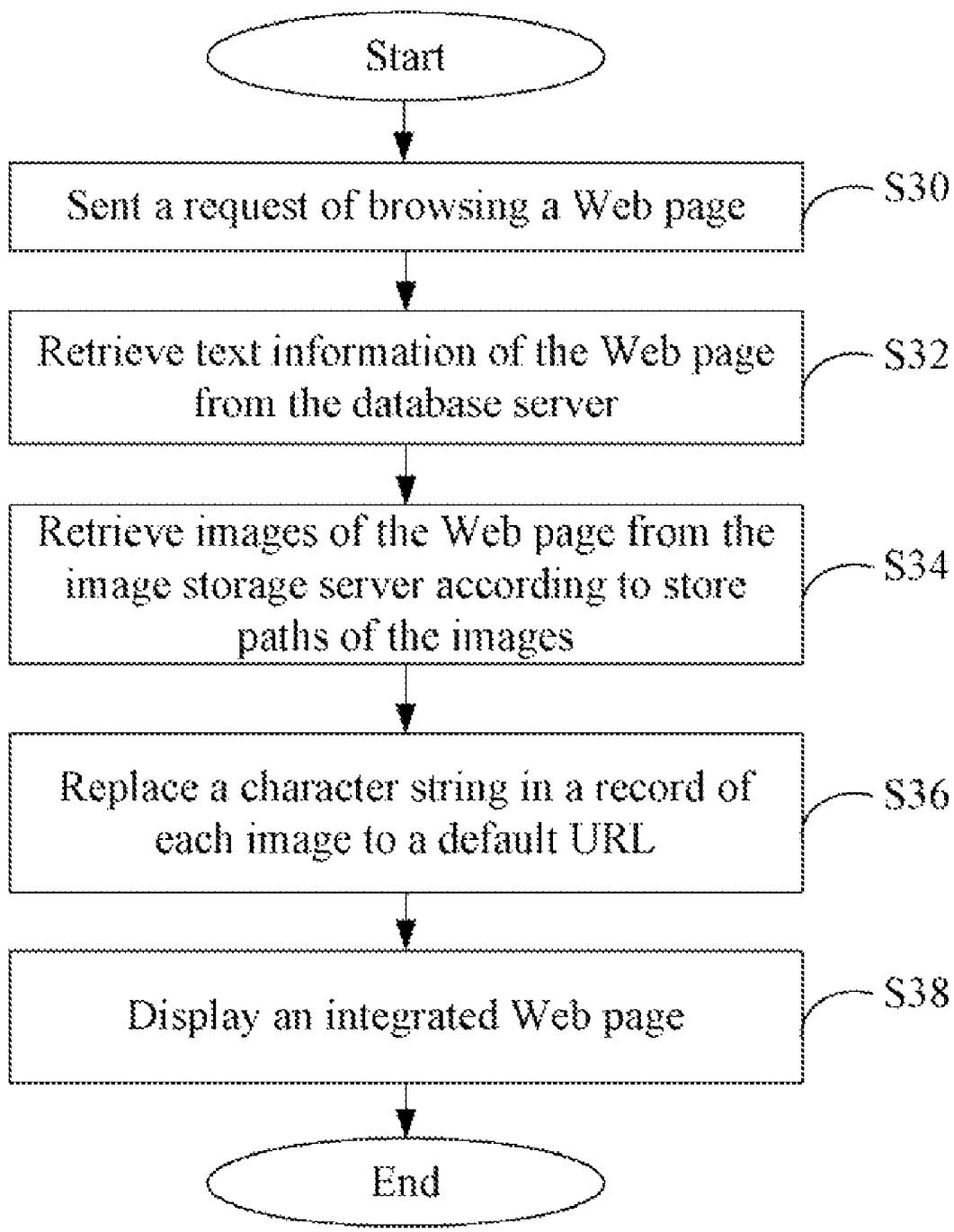
FIG. 4 is a flowchart illustrating a method for browsing downloaded data in the local server based on a request of a user on one of the client computers in FIG. 1.

FIG. 4 is a flowchart illustrating a method for browsing downloaded data in the local server 10 based on a request of a user on one of the client computers 70. In step S30, the user sends a request of browsing downloaded data, such as browsing a news Web page, to the local server 10. In step S32, the local server 10 retrieves text content of the news Web page stored in the database server 40. In step S34, the local server 10 retrieves images of the news Web page from the image storage server 50 according to data paths in their respective records. In step S36, the local server 10 replaces a character string in a record of each image to a default local URL that can display the image. In step S38, an integrated news Web page with text content and images can be displayed to the user via a display device.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for processing downloaded data, comprising a local server, a database, and an image storage, the database and the image storage being connected to the local server, the local server comprising:
    a data cache for storing the downloaded data temporarily;
    a data parsing module configured for parsing the downloaded data to retrieve text content and an original uniform resource locator (URL) address of each image from the downloaded data, wherein the text content comprises web site information, a publisher, a publish time, a title, and a summary of the download data;
    an image attribute changing module configured for replacing the original URL address of each of the images with a predetermined character string which includes an identifier of the image;
    a data storing module configured for storing the text content and character strings of all the images in the downloaded data to the database;
    the database being configured for creating a record for each of the images to record information of each of the images and returning the image information to the data parsing module;
    the data parsing module being further configured for retrieving an image from the data cache based on the returned image information in each record; and
    the data storing module being further configured for storing all retrieved images to the image storage, and storing data paths of the retrieved images returned by the image storage to corresponding records of the images.

2. The system as claimed in claim 1, wherein the database is further configured for allocating an identification number to the downloaded data and an identification number to each image in the downloaded data.

3. The system as claimed in claim 2, wherein the returned image information comprises: the identification number of the downloaded data which the image belongs to, the identification number of the image, the original URL information of the image, the character string that replaces the original URL information of the image.

4. A computer-based method for processing downloaded data, comprising:

storing downloaded data to a data cache of a local server temporarily;

parsing the downloaded data to retrieve text content and original URL information of each image in the downloaded data, wherein the text content comprises web site information, a publisher, a publish time, a title, and a summary of the download data;

replacing the original URL information of each image by a predetermined character string which includes an identifier of the image;

storing the text content and character strings of all images in the downloaded data to a database;

creating a record for each image to record information of the image;

returning image information in each record to the local server;

retrieving an image from the data cache based on the returned image information in each record;

storing all retrieved images to an image storage; and storing data paths of the retrieved images returned by the image storage to respective records of the images.

5. The method as claimed in claim 4, further comprising:

allocating an identification number to the downloaded data and an identification number to each image in the downloaded data.

6. The method as claimed in claim 5, wherein the returned image information in each record comprises: the identification number of the downloaded data which the image belongs to, the identification number of the image, the original URL information of the image, and the character string that replaces the original URL information of the image.

* * * * *